United States Patent
Houck

(10) Patent No.: US 11,745,786 B1
(45) Date of Patent: Sep. 5, 2023

(54) STEERING CONTROL SYSTEM HAVING A TELESCOPING STEERING WHEEL RIM

(71) Applicant: GM Global Technology Operations LLC, Detroit, MI (US)

(72) Inventor: Thomas E. Houck, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/870,120

(22) Filed: Jul. 21, 2022

(51) Int. Cl.
*B62D 1/10* (2006.01)
*B60R 21/203* (2006.01)
*B62D 1/08* (2006.01)

(52) U.S. Cl.
CPC .............. *B62D 1/10* (2013.01); *B60R 21/203* (2013.01); *B62D 1/08* (2013.01)

(58) Field of Classification Search
CPC .. B62D 1/10; B62D 1/08; B62D 1/105; B60R 21/203; B60R 21/2032
USPC .......................................................... 74/493
See application file for complete search history.

(56) References Cited

U.S. PATENT DOCUMENTS

| | | | | |
|---|---|---|---|---|
| 3,600,003 A | * | 8/1971 | Carey .................. | B60R 21/203 280/729 |
| 3,801,123 A | * | 4/1974 | Jira ..................... | B60R 21/2032 74/492 |
| 5,553,888 A | * | 9/1996 | Turner ................ | B60R 21/2032 74/552 |
| 11,198,464 B2 | * | 12/2021 | Watanabe ............ | B62D 1/183 |

* cited by examiner

*Primary Examiner* — Drew J Brown
*Assistant Examiner* — Matthew Joseph Ganci
(74) *Attorney, Agent, or Firm* — CANTOR COLBURN LLP

(57) ABSTRACT

A steering control system includes a hub connectable to a steering shaft defining a steering axis. An airbag receiving zone is formed in the hub. A steering wheel is connected to the hub, the steering wheel includes a central hub member, a plurality of spokes each having a first end extending from the central hub member and a second end, and a steering wheel rim connected to the second end of each of the plurality of spokes. The central hub member being slidably mounted to the hub along the steering axis.

20 Claims, 5 Drawing Sheets

STEERING CONTROL SYSTEM HAVING A TELESCOPING STEERING WHEEL RIM

INTRODUCTION

The subject disclosure relates to the art of vehicles and, more particularly, to a steering control system for a vehicle having a telescoping steering wheel rim.

Vehicles include steering wheels that allow a driver to control vehicle direction. Modern vehicles include an airbag mounted centrally within the steering wheel. The airbag is inflated upon sensing crash forces in order to provide protection to the driver. Also, in many modern vehicles, the steering wheel is adjustable. That is, the steering wheel may be moved toward or away from the driver in order to accommodate various body types.

Certain drivers may move the steering wheel to a forward limit of adjustment. Positioning the steering wheel at the forward limit of adjustment may place the airbag closer to the driver than recommended. That is, the airbag, being connected to the steering wheel, also moves toward the forward limit of adjustment. Accordingly, it is desirable to provide a steering wheel that may be adjusted without positioning the airbag near the forward limit of adjustment.

SUMMARY

In a non-limiting example, a steering control system includes a hub connectable to a steering shaft defining a steering axis. An airbag receiving zone is formed in the hub. A steering wheel is connected to the hub, the steering wheel includes a central hub member, a plurality of spokes each having a first end extending from the central hub member and a second end, and a steering wheel rim connected to the second end of each of the plurality of spokes. The central hub member being slidably mounted to the hub along the steering axis.

In addition to one or more of the features described herein, the hub includes a base wall, and a plurality of walls that define an airbag receiving zone, the base wall supporting a steering shaft connecting member.

In addition to one or more of the features described herein, a steering shaft connecting plate is mounted to the base wall.

In addition to one or more of the features described herein, an airbag mounting plate is connected to the base wall and the steering shaft connecting plate.

In addition to one or more of the features described herein, an airbag is connected to the airbag mounting plate and arranged in the airbag receiving zone.

In addition to one or more of the features described herein, the plurality of walls define an inner sleeve including a first side wall, a second side wall arranged opposite the first side wall, a top wall connected to the first side wall and the second side wall, and a bottom wall spaced from the top wall and connected to the first side wall and the second side wall, the top wall including a plurality of adjustment openings extending parallel to the steering axis.

In addition to one or more of the features described herein, the first side wall includes a first guide slot and the second side wall includes a second guide slot, the first and second guide slots extending substantially parallel to the steering axis.

In addition to one or more of the features described herein, the central hub member defines an outer sleeve having an upper wall, a lower wall, a first side wall portion and a second side wall portion that extend about the inner sleeve, the outer sleeve being sliceable along the steering axis relative to the inner sleeve.

In addition to one or more of the features described herein, the outer sleeve a first guide stop provided on the first side wall portion and a second guide stop provided on the second side wall portion, the first guide stop and the second guide stop being received by the first guide slot and the second guide slot respectively.

In addition to one or more of the features described herein, an adjustment pin is mounted to the upper wall, the adjustment pin selectively engaging one of the plurality of adjustment openings.

A vehicle, in accordance with a non-limiting example, includes a plurality of wheels and a body supported by the plurality of wheels. The body defines a passenger compartment. A dashboard is arranged in the passenger compartment. A seat is arranged in the passenger compartment spaced from the dashboard. A steering shaft is arranged adjacent to the dashboard. The steering shaft defines a steering axis. A steering control system is arranged between the dashboard and the seat. The steering control system includes a hub connected to the steering shaft. An airbag receiving zone formed in the hub. An airbag mounted in the airbag receiving zone. A steering wheel is connected to the hub. The steering wheel includes a central hub member, a plurality of spokes each having a first end extending from the central hub member and a second end, and a steering wheel rim connected to the second end of each of the plurality of spokes. The central hub member is slidably mounted to the hub along the steering axis.

In addition to one or more of the features described herein, the hub includes a base wall, and a plurality of side walls that define an airbag receiving zone, the base wall supporting a steering shaft connecting member.

In addition to one or more of the features described herein, a steering shaft connecting plate is mounted to the base wall.

In addition to one or more of the features described herein, an airbag mounting plate connected to the base wall and the steering shaft connecting plate.

In addition to one or more of the features described herein, the airbag is connected to the airbag mounting plate in the airbag receiving zone.

In addition to one or more of the features described herein, the plurality of side walls define an inner sleeve including a first side wall, a second side wall arranged opposite the first side wall, a top wall connected to the first side wall and the second side wall, and a bottom wall spaced from the top wall and connected to the first side wall and the second side wall, the top wall including a plurality of adjustment openings extending parallel to the steering axis.

In addition to one or more of the features described herein, the first side wall includes a first guide slot and the second side wall includes a second guide slot, the first and second guide slots extending substantially parallel to the steering axis.

In addition to one or more of the features described herein, the central hub member defines an outer sleeve having an upper wall, a lower wall, a first side wall portion and a second side wall portion that extend about the inner sleeve, the outer sleeve being sliceable along the steering axis relative to the inner sleeve.

In addition to one or more of the features described herein, the outer sleeve a first guide stop provided on the first side wall portion and a second guide stop provided on the second side wall portion, the first guide stop and the second guide stop being received by the first guide slot and the second guide slot respectively.

In addition to one or more of the features described herein, an adjustment pin is mounted to the upper wall, the adjustment pin selectively engaging one of the plurality of adjustment openings.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
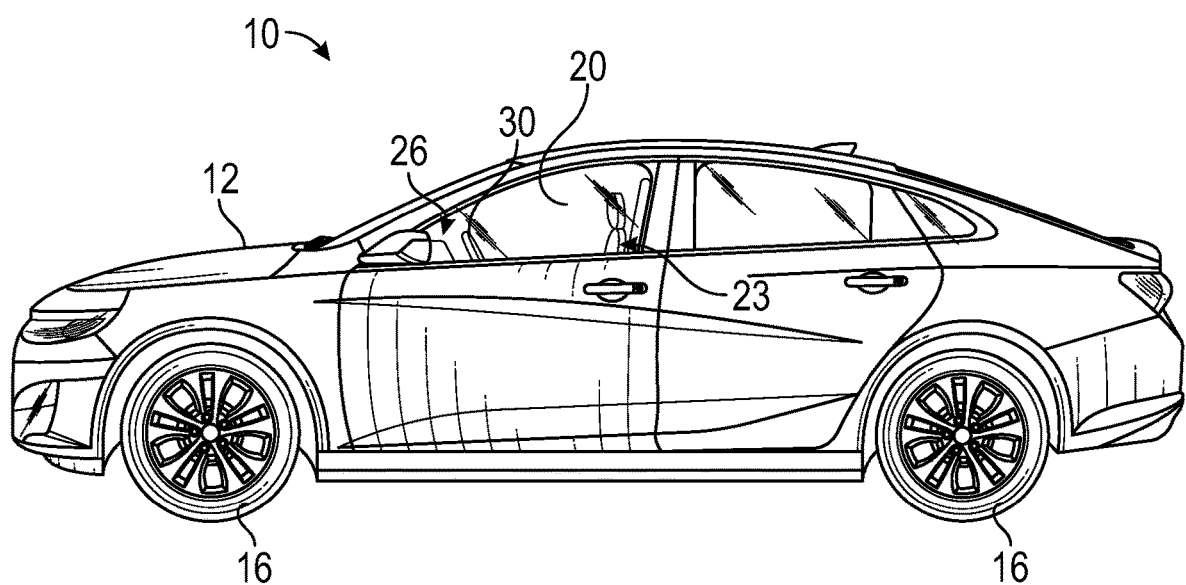
FIG. 1 is a side view of a vehicle including a steering control system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least one of the plurality of wheels 16 is a steerable wheel. That is, changing a position of two of the plurality of wheels 16 relative to body 12 will cause vehicle 10 to change direction. In the non-limiting example shown, both front wheels (not separately labeled) of the plurality of wheels 16 are steerable. Body 12 defines, in part, a passenger compartment 20 having seats 23 positioned behind a dashboard 26. A steering control system 30 is arranged between seats 23 and dashboard 26. Steering control system 30 is operated to control the orientation of the steerable wheel(s).

Figure 2:
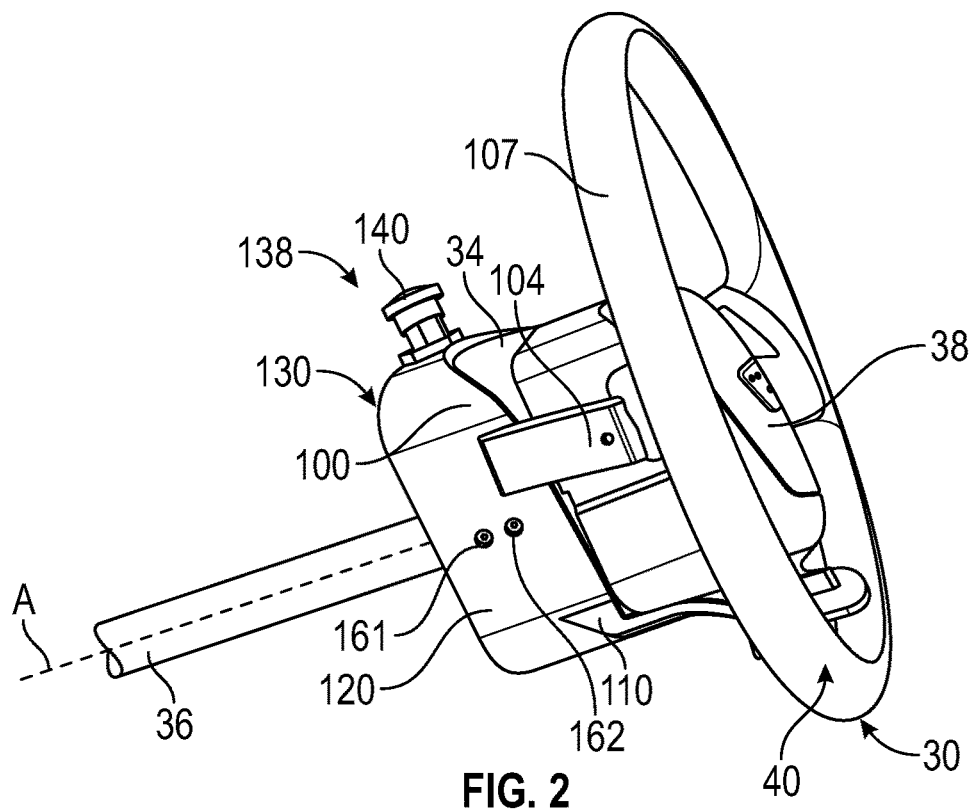
FIG. 2 is a perspective view of the steering control system of FIG. 1 in an inward most adjustment position, in accordance with a non-limiting example.
Figure 3:
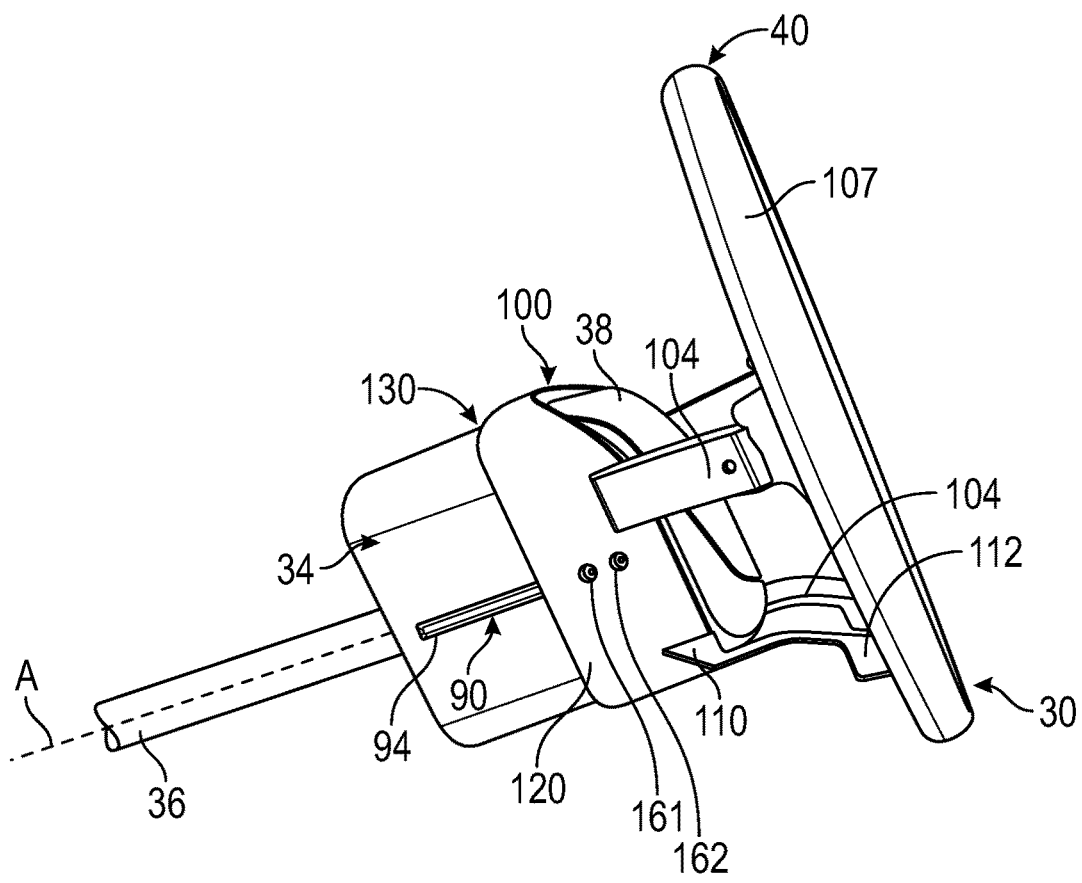
FIG. 3 is a perspective view of the steering control system of FIG. 1 in an outward most adjustment position, in accordance with a non-limiting example.

In a non-limiting example shown in FIGS. 2 and 3, steering control system 30 includes a hub 34 that is connected to a steering shaft 36 which defines a steering axis "A". Hub 34 supports a supplemental restraint system (SRS) in the form of an airbag 38. Hub 34 also supports a steering wheel 40. As will be detailed more fully herein, steering wheel 40 may transition over hub 34 along steering axis "A" between an inward most adjustment position (FIG. 2) and an outward most adjustment position (FIG. 3). Steering wheel 40 may also be selectively arranged at one or more intermediate adjustment positions that are defined between the inward most adjustment position and the outward most adjustment position.

Figure 4:
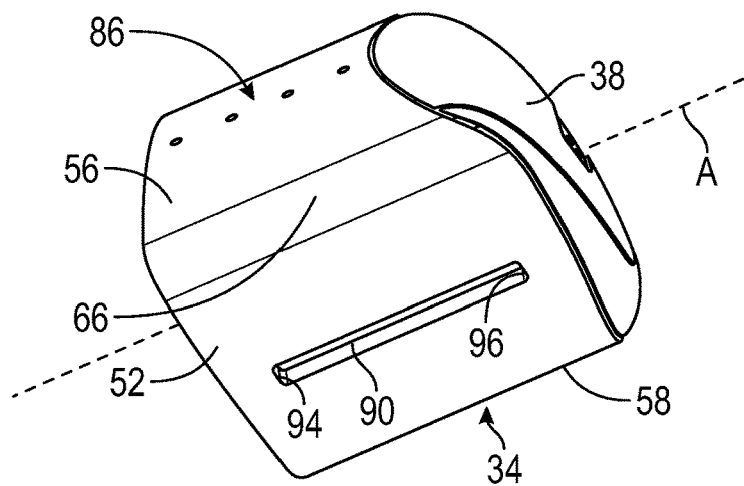
FIG. 4 is a side perspective view of a hub of the steering control system of FIG. 2, in accordance with a non-limiting example.
Figure 5:
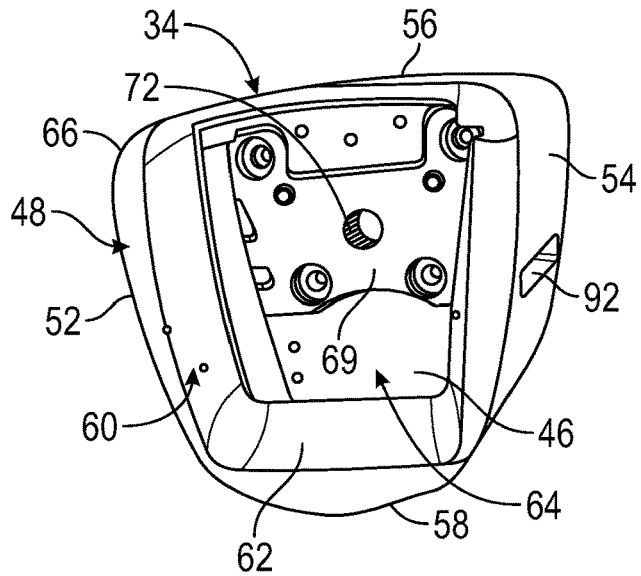
FIG. 5 is a front perspective view of the hub of FIG. 4 showing a steering shaft connector plate mounted to a bottom wall of an airbag receiving zone, in accordance with a non-limiting example.

Referring to FIGS. 4 and 5, hub 34 includes a base wall 46 and a plurality of walls 48 that extend from and surround base wall 46. Plurality of walls 48 include a first side wall 52, a second side wall 54, a top wall 56, and a bottom wall 58. Plurality of walls 48 define an inner sleeve 60. Inner sleeve 60 includes an inner surface 62 that defines, together with base wall 46, an airbag receiving zone 64. Base wall 46 separates airbag receiving zone 64 from a recess 65 (FIG. 6) formed in a rear of back side (not separately labeled) of hub 34.

Figure 6:
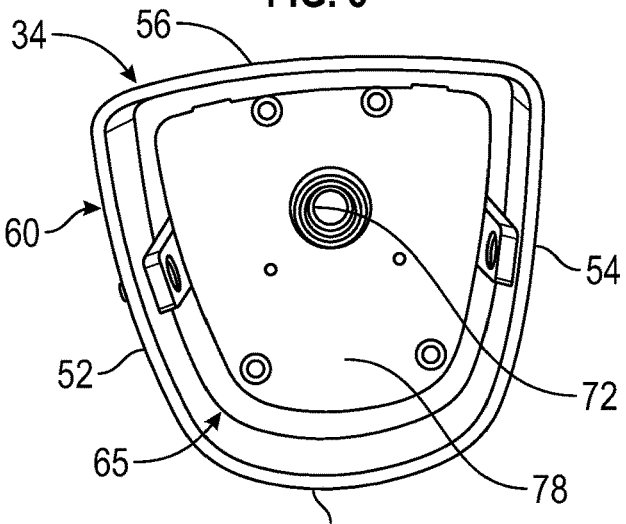
FIG. 6 is a rear perspective view of the hub of FIG. 4 showing the steering shaft connector plate assembly positioned in an inner surface, in accordance with a non-limiting example.

Inner sleeve 60 also includes an outer surface 66. In a non-limiting example, a steering shaft connector bracket 69 including a central splined opening 72 is mounted in a cut out (not separately labeled) formed in base wall 46. An airbag mounting bracket 78 is mounted in recess 65 as shown in FIG. 6. Airbag 38 is mounted in airbag receiving zone 64 and connected to airbag mounting bracket 78 by fasteners that pass through steering shaft connector bracket 69. While described as separate components, steering shaft connector bracket 69 and airbag mounting bracket 78 may be integrated into a single device.

In a non-limiting example, inner sleeve 60 includes a plurality of adjustment openings 86 (FIG. 4) that define the inward most adjustment position, the outward most adjustment position, and the intermediate adjustment positions. Plurality of adjustment openings 86 are shown as extending parallel to steering axis "A" on top wall 56. However, it should be understood that the particular location and number of adjustment openings may vary. Hub 34 also supports a first guide slot 90 on first side wall 52 (FIG. 4) and a second guide slot 92 formed in second side wall 54 (FIG. 5).

First and second guide slots 90 and 92 promote shifting of steering wheel 40 over hub 34 as well as provide travel stops. For example, as shown in FIG. 4, first guide slot 90 includes a first end portion 94 that may limit inward travel (e.g., travel of the steering wheel away from a driver) of steering wheel 40 beyond the inward most adjustment position and a second end portion 96 that may limit outward travel (e.g., travel of the steering wheel toward the driver) of steering wheel 40 beyond the outward most adjustment position.

Figure 7:
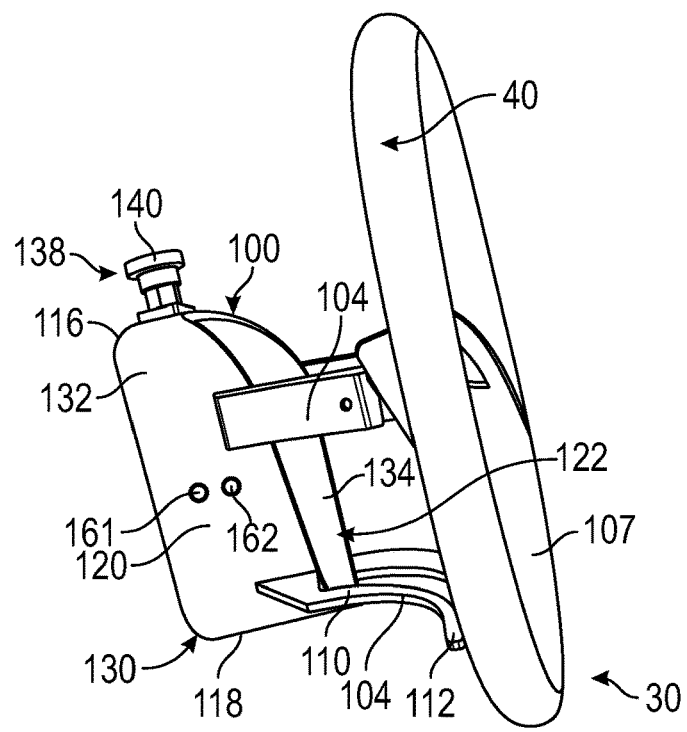
FIG. 7 is a side perspective view of a steering wheel of the steering control of FIG. 2, in accordance with a non-limiting example.
Figure 8:
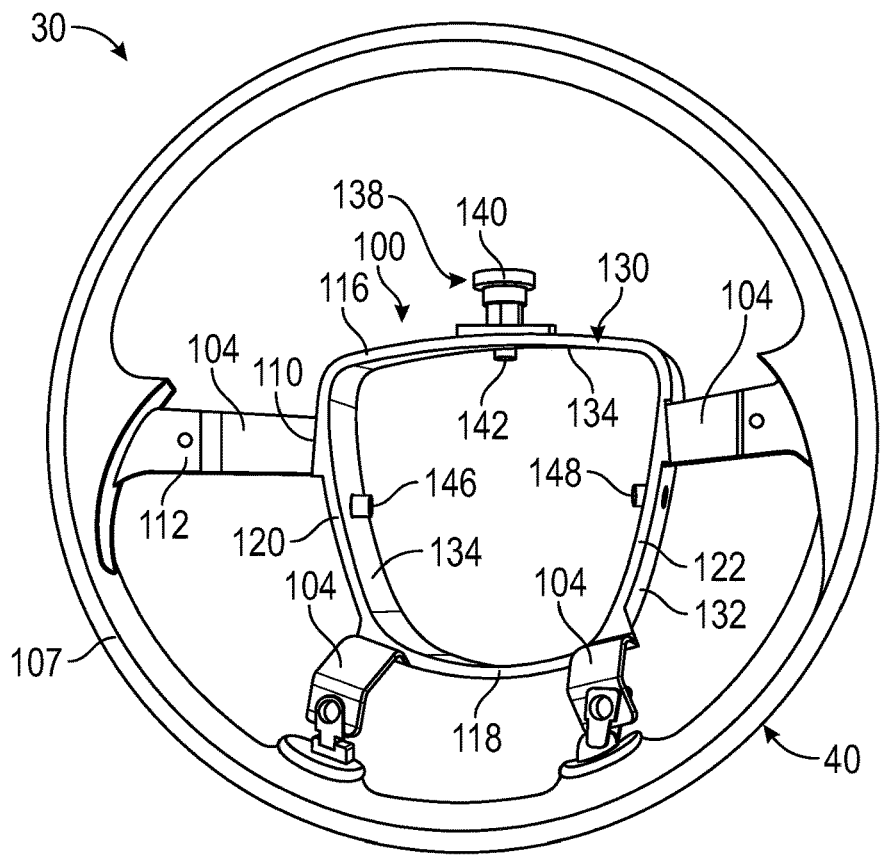
FIG. 8 is a front view of the steering wheel of FIG. 7 in accordance with a non-limiting example.

Referring to FIGS. 7 and 8, steering wheel 40 includes a central hub member 100 from which extend a plurality of spokes 104 that support a steering wheel rim 107. That is, each of the plurality of spokes 104 includes a first end 110 coupled to central hub member 100 and a second end 112 coupled to steering wheel rim 107. In a non-limiting example, central hub member 100 includes an upper wall 116, a lower wall 118, a first side wall portion 120, and a second side wall portion 122 that collectively define an outer sleeve 130. Outer sleeve 130 is shiftable over inner sleeve 60 (FIG. 5). Outer sleeve 130 includes an outer surface 132 and an inner surface 134.

Figure 9:
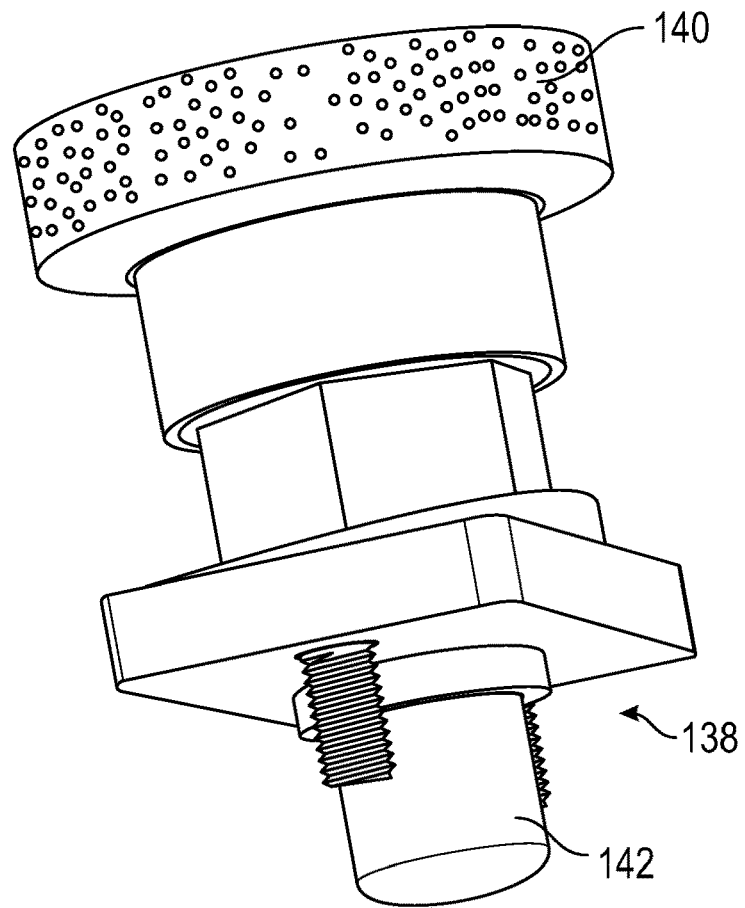
FIG. 9 is a perspective view of an adjustment pin of the steering control system of FIG. 2, in accordance with a non-limiting example.

Central hub member 100 supports an adjustment pin 138 on upper wall 116. Of course, it should be understood that the position of adjustment pin 138 may vary and will correspond to the position of the plurality of adjustment openings 86. As shown in FIG. 9, adjustment pin 138 includes a knob 140 and a selectively retractable pin element 142. Pin element extends beyond inner surface 134 and into a select one of the plurality of adjustment openings 86. Knob 140 may be manipulated, (e.g., raised) to retract pin element 142 from the one of the plurality of adjustment openings 86 FIG. 4 allowing outer sleeve 130 to transition over inner sleeve 60. Releasing knob 140 allows pin element 142 to move inwardly and into, for example, another of the plurality of adjustment openings 86.

Figure 10:
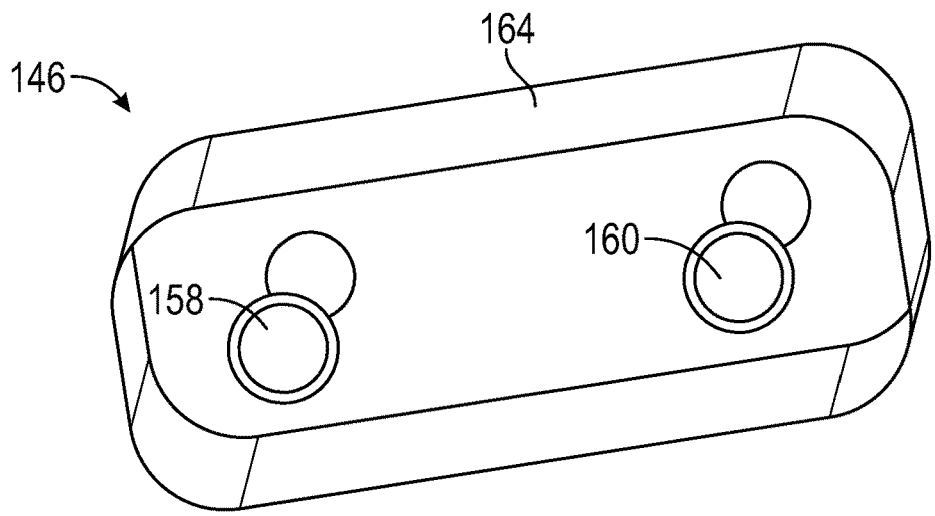
FIG. 10 is a perspective view of a guide stop of the steering control system of FIG. 2, in accordance with a non-limiting example.

Central hub member 100 also supports a first guide stop 146 and a second guide stop 148 on inner surface 134. First guide stop 146 nests within first guide slot 90 and second guide stop 148 nests within second guide slot 92 to align and promote sliding of outer sleeve 130 relative to inner sleeve 60. Reference will now follow to FIG. 10 in describing first guide stop 146 with an understanding that second guide stop 148 include similar structure.

First guide stop 146 includes a first opening 158 and a second opening 160 that correspond to first and second opening portions 161 and 162 formed in first side wall portion 120 of central hub 100 as shown in FIG. 7. Fasteners (not separately labeled) extend through first and second openings 158, 160 and first and second opening portions 161, 162 to secure first guide stop 146 to inner surface 134. First guide stop 146 also include an outer peripheral edge 164 that is sized to nest within, and shift relative to, first guide slot 90.

At this point, it should be understood that while described as employing guide stops that shift within slots, other devices, including ball bearings, roller bearings, and the like may be used to facilitate the transitioning of outer sleeve 130 over inner sleeve 60. Further, the non-limiting example described herein depicts a steering control system having a steering wheel that may move relative to an airbag so as to accommodate drivers having various statures without moving the airbag too close to a driver having a shorter stature. That is, while the steering wheel may be shifted toward the driver and/or away from the driver, the position of the airbag remains unchanged. In this manner, the position of the steering wheel may be adjusted without moving the airbag to close to the driver's body.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A steering control system comprising:
a hub connectable to a steering shaft defining a steering axis;
an airbag receiving zone formed in the hub; and
a steering wheel connected to the hub, the steering wheel including a central hub member, a plurality of spokes each having a first end extending from the central hub member and a second end, and a steering wheel rim connected to the second end of each of the plurality of spokes, the central hub member being slidably mounted relative to the hub and the airbag receiving zone along the steering axis.

2. The steering control system according to claim 1, wherein the hub includes a base wall, and a plurality of walls that define an airbag receiving zone, the base wall supporting a steering shaft connecting member.

3. The steering control system according to claim 2, further comprising a steering shaft connecting plate mounted to the base wall.

4. The steering control system according to claim 3, further comprising an airbag mounting plate connected to the base wall and the steering shaft connecting plate.

5. The steering control system according to claim 4, wherein the airbag is connected to the airbag mounting plate and arranged in the airbag receiving zone.

6. The steering control system according to claim 2, wherein the plurality of walls define an inner sleeve including a first side wall, a second side wall arranged opposite the first side wall, a top wall connected to the first side wall and the second side wall, and a bottom wall spaced from the top wall and connected to the first side wall and the second side wall, the top wall including a plurality of adjustment openings extending parallel to the steering axis.

7. The steering control system according to claim 6, wherein the first side wall includes a first guide slot and the second side wall includes a second guide slot, the first and second guide slots extending substantially parallel to the steering axis.

8. The steering control system according to claim 7, wherein the central hub member defines an outer sleeve having an upper wall, a lower wall, a first side wall portion and a second side wall portion that extend about the inner sleeve, the outer sleeve being sliceable along the steering axis relative to the inner sleeve.

9. The steering control system according to claim 8, wherein the outer sleeve a first guide stop provided on the first side wall portion and a second guide stop provided on the second side wall portion, the first guide stop and the second guide stop being received by the first guide slot and the second guide slot respectively.

10. The steering control system according to claim 8, further comprising an adjustment pin mounted to the upper wall, the adjustment pin selectively engaging one of the plurality of adjustment openings.

11. A vehicle comprising:
a plurality of wheels;
a body supported by the plurality of wheels, the body defining a passenger compartment;
a dashboard arranged in the passenger compartment;
a seat arranged in the passenger compartment spaced from the dashboard;
a steering shaft arranged adjacent to the dashboard, the steering shaft defining a steering axis; and
a steering control system arranged between the dashboard and the seat, the steering control system comprising:
a hub connected to the steering shaft;
an airbag receiving zone formed in the hub;
an airbag mounted in the airbag receiving zone; and
a steering wheel connected to the hub, the steering wheel including a central hub member, a plurality of spokes each having a first end extending from the central hub member and a second end, and a steering wheel rim connected to the second end of each of the plurality of spokes, the central hub member being slidably mounted relative to the hub and the airbag receiving zone along the steering axis.

12. The vehicle according to claim 11, wherein the hub includes a base wall, and a plurality of side walls that define an airbag receiving zone, the base wall supporting a steering shaft connecting member.

13. The vehicle according to claim 12, further comprising a steering shaft connecting plate mounted to the base wall.

14. The vehicle according to claim 13, further comprising an airbag mounting plate connected to the base wall and the steering shaft connecting plate.

15. The vehicle according to claim 14, wherein the airbag is connected to the airbag mounting plate in the airbag receiving zone.

16. The vehicle according to claim 12, wherein the plurality of side walls define an inner sleeve including a first side wall, a second side wall arranged opposite the first side wall, a top wall connected to the first side wall and the second side wall, and a bottom wall spaced from the top wall and connected to the first side wall and the second side wall, the top wall including a plurality of adjustment openings extending parallel to the steering axis.

17. The vehicle according to claim 16, wherein the first side wall includes a first guide slot and the second side wall includes a second guide slot, the first and second guide slots extending substantially parallel to the steering axis.

18. The vehicle according to claim 17, wherein the central hub member defines an outer sleeve having an upper wall, a lower wall, a first side wall portion and a second side wall portion that extend about the inner sleeve, the outer sleeve being sliceable along the steering axis relative to the inner sleeve.

19. The vehicle according to claim 18, wherein the outer sleeve a first guide stop provided on the first side wall portion and a second guide stop provided on the second side wall portion, the first guide stop and the second guide stop being received by the first guide slot and the second guide slot respectively.

20. The vehicle according to claim 18, further comprising an adjustment pin mounted to the upper wall, the adjustment pin selectively engaging one of the plurality of adjustment openings.

* * * * *